UNITED STATES PATENT OFFICE.

GUY M. GARLICK, OF KALAMAZOO, MICHIGAN, ASSIGNOR TO WILLIAM S. MITCHELL, OF GARY, INDIANA.

PROCESS OF MAKING WATERPROOFING COMPOSITIONS.

1,315,109.      Specification of Letters Patent.      Patented Sept. 2, 1919.

No Drawing.      Application filed March 5, 1918. Serial No. 220,509.

*To all whom it may concern:*

Be it known that I, GUY M. GARLICK, a citizen of the United States, residing at Kalamazoo, in the county of Kalamazoo and State of Michigan, have invented new and useful Improvements in Processes of Making Waterproofing Compositions, of which the following is a specification.

My present invention relates to a novel and improved process of making waterproofing compositions applicable generally to various porous substances or materials and especially to textile or other fabrics of various kinds, whereby such compositions may be prepared easily and inexpensively, may be applied easily and while cold, and the resulting composition when applied is effective, durable and permanent.

The process is applied to the preparation of a composition comprising as its principal constituents a wax, rubber, and a resinous substance. An example of a waterproofing composition to which the present invention is particularly applicable and the proportions of the constituents thereof are as follows:

| | |
|---|---|
| Refined paraffin wax | 12–24 oz. |
| Rubber in liquid form or rubber cement | 15–30 oz. |
| Resin, resin oil or gum mastic | 2–6 oz. |
| Resin, resin oil or gum mastic dissolved in alcohol in the proportion of three parts alcohol to one part of resin, resin oil or mastic | 25–50 oz. |
| Light hydrocarbon oil, such as gasolene, benzene, naphtha or kerosene | 80–165 oz. |
| Carbon bisulfid | 6–12 oz. |

In preparing a composition comprising the constituents above described, the process is carried out as follows to form a saturated solution:

The paraffin or wax and the dry resinous substance are placed in a vessel and heated until the solids assume a liquid form. The rubber in liquid form or rubber cement is then added and the temperature of the liquid mass is raised to from 250° F. to 350° F., a temperature of of about 305° being generally preferable. During this time the liquid mass is agitated or stirred and when the proper temperature has been attained, the constituents of the mass will unite or combine and form a homogeneous mass.

After this has occurred, the temperature of the mass is reduced to at least 140° F., or less, and the solution of alcohol and resin, alcohol and resin oil or alcohol and mastic is then added to the mass together with from six to twelve ounces of the light hydrocarbon oil, such as gasolene, benzene, naphtha or kereosene, the mass being agitated during this mixing. The mass is then heated until its temperature is raised to from 150° F. to 250° F., a temperature of 180° F. being generally preferable, and during this time the mass is agitated. While the mass is at a temperature of between 100° F. and 180° F. (a temperature of about 140° F. being preferred) 80 to 153 ounces of the light hydrocarbon oil, such as gasolene, benzene, naphtha or kerosene, are added, the mass being slowly agitated, after which the temperature of the mass is permitted to drop to from 60° F. to 80° F. and 6 to 12 ounces of carbon bisulfid are added.

After straining and settling off, the composition is ready for use, it being in the form of an extremely thin liquid which can be readily applied by brushing, immersion or other suitable means. The consistency of the preparation is varied by varying the proportions of its constituents within the ranges specified above. For example, by using the larger percentages of wax, rubber and resinous substance, a relatively thick liquid is obtained while a relatively thin liquid is obtained by using the lower percentages of these substances. Obviously, intermediate consistencies can be obtained by using percentages intermediate of the ranges above specified.

Paraffin is generally preferable as a wax, but other suitable waxes which do not contain oil may be used. The rubber in liquid form or rubber cement may be rubber dissolved in gasolene or other solvent. The carbon bisulfid is employed to impart to the preparation the ability to penetrate the very small pores or interstices of the substance or material to which the preparation is applied. In some cases carbon tetrachlorid may be used in place of the carbon bisulfid.

The preparation, as stated, may be readily applied to porous materials or substances of various kinds with great facility while in liquid form and while cold or at ordinary atmospheric temperature. However, shortly after application of the composition or preparation, the light hydrocarbon oil evaporates, leaving the composition in solid permanent condition.

The composition is capable of application generally to porous substances or materials for the purpose of waterproofing and preserving them and for protecting such substances, as metals, from corrosion. In applying the composition to fabrics, the composition penetrates or impregnates the fibers of the threads composing the fabric, and a fabric so treated will shed water. Fabrics treated by the improved composition retain their flexibility and are not subject to cracking when rolled or folded.

I claim as my invention:

1. The herein described process of making a composition of matter, which comprises heating a mixture consisting of wax, dissolved rubber and a resinous substance to a temperature which will cause homogeneous union thereof, and adding a light hydrocarbon oil to dilute the mass to a consistency suitable for application thereof.

2. The herein described process of making a composition of matter, which comprises heating a mixture consisting of wax, dissolved rubber and a resinous substance to a raised temperature sufficient to reduce such constituents to a liquid homogeneous mass, adding to the mass, while at a reduced temperature, a light hydrocarbon oil, and adding to the resultant mass, while at a further reduced temperature, a penetrative agent.

3. The herein described process of making a waterproofing composition, which comprises heating a mixture consisting of wax and a resinous substance at a raised temperature sufficient to liquefy the same, adding to such liquefied mixture dissolved rubber and heating the resulting mixture to a raised temperature sufficient to cause homogeneous union of its constituents, adding to the resultant mass a light hydrocarbon diluent, and then adding a penetrative agent.

4. The herein described process of making a waterproofing composition, which comprises heating a mixture of melted wax and resinous substance and dissolved rubber to a temperature ranging between 250° and 350° F., and adding a light hydrocarbon diluent to the resulting mass.

5. The herein described process of making a waterproofing composition, which comprises heating a mixture of melted wax and resinous substance and dissolved rubber to a raised temperature of approximately 305° F., and then adding to the mass, while at a lower temperature, a light hydrocarbon oil.

6. The herein described process of making a waterproofing composition, which comprises heating a mixture of melted wax and resinous substance and dissolved rubber to a raised temperature sufficient to cause homogeneous union of such constituents, adding to the mass a dissolved resinous substance, and then adding a light hydrocarbon oil.

7. The herein described process of making a waterproofing composition, which comprises heating a mixture of melted wax and resinous substance and dissolved rubber to a raised temperature sufficient to cause homogeneous union of such constituents, adding to the resultant mass, while at a reduced temperature, a resinous substance dissolved in its solvent, and a light hydrocarbon oil, and then adding to the resultant mass a hydrocarbon diluent.

8. The herein described process of making a waterproofing composition, which comprises heating a mixture of melted wax and resinous substance and dissolved rubber to a raised temperature sufficient to cause homogeneous union of such constituents, adding to the mass, while at a lower temperature, a resinous substance dissolved in alcohol and a light hydrocarbon oil, and subsequently adding a light hydrocarbon diluent.

9. The herein described process of making a waterproofing composition, which comprises heating a mixture of melted wax and a resinous substance and dissolved rubber to a temperature of between 250° and 350° F., adding to the resultant mass, while at a reduced temperature, a resinous substance dissolved in alcohol and a light hydrocarbon oil, then heating the mass to a temperature of between 150° and 250° F., and then adding to the mass a light hydrocarbon oil while the mass is at a temperature of between 100° and 180° F.

10. The herein described process of making a waterproofing composition, which comprises heating a mixture of melted wax and a resinous substance and dissolved rubber to a temperature of approximately 305° F., adding to the resulting mass, while at a temperature not more than 140° F., a resinous substance dissolved in alcohol and a light hydrocarbon oil, then raising the temperature of the mass to approximately 180°

F., adding to the mass, while at a temperature of approximately 140° F., a light hydrocarbon oil sufficient to dilute the mass to the desired degree, and then adding to the mass, while at a temperature of between 60° and 80° F., carbon bisulfid.

In testimony whereof I have hereunto set my hand in presence of two subscribing witnesses.

GUY M. GARLICK.

Witnesses:
C. A. BATEMAN,
CHAS. S. HYER.